(12) United States Patent
Peng et al.

(10) Patent No.: US 10,302,758 B2
(45) Date of Patent: May 28, 2019

(54) METHOD AND DEVICE FOR DETECTING DISCONTINUOUS BODY WITH GROUND PENETRATING RADAR

(71) Applicant: China University of Mining & Technology, Beijing, Beijing (CN)

(72) Inventors: Suping Peng, Beijing (CN); Jingtao Zhao, Beijing (CN); Xianlei Xu, Beijing (CN); Wenfeng Du, Beijing (CN); Xiaoqin Cui, Beijing (CN)

(73) Assignee: China University of Mining & Technology, Beijing, Beijing (CN)

( * ) Notice: Subject to any disclaimer, the term of this patent is extended or adjusted under 35 U.S.C. 154(b) by 0 days.

(21) Appl. No.: 15/755,911

(22) PCT Filed: Dec. 29, 2016

(86) PCT No.: PCT/CN2016/113068
§ 371 (c)(1),
(2) Date: Feb. 27, 2018

(87) PCT Pub. No.: WO2018/086222
PCT Pub. Date: May 17, 2018

(65) Prior Publication Data
US 2018/0335517 A1    Nov. 22, 2018

(30) Foreign Application Priority Data

Nov. 10, 2016    (CN) .......................... 2016 1 0991641

(51) Int. Cl.
*G01V 3/12*    (2006.01)
*G01V 8/00*    (2006.01)
(Continued)

(52) U.S. Cl.
CPC .......... *G01S 13/885* (2013.01); *G01S 13/426* (2013.01); *G01V 3/12* (2013.01); *G01V 8/005* (2013.01);
(Continued)

(58) Field of Classification Search
CPC .... G01S 13/885; G01S 13/426; G01S 7/2922; G01S 2007/2883; G01V 8/005; G01V 3/12
(Continued)

(56) References Cited

U.S. PATENT DOCUMENTS 9,476,972 B2 * 10/2016 Kim .................... G01S 13/0209
2006/0279450 A1 * 12/2006 Annan ...................... G01S 7/28
342/22

FOREIGN PATENT DOCUMENTS

CN    101872018 A    10/2010
CN    102540184 A    7/2012
(Continued)

OTHER PUBLICATIONS

International Search Report for Application No. PCT/CN2016/113068, dated Jul. 14, 2017.
(Continued)

*Primary Examiner* — Frank J McGue
(74) *Attorney, Agent, or Firm* — The Dobrusin Law Firm, P.C.

(57) ABSTRACT

A method and a device for detecting a discontinuous body with ground penetrating radar, comprising acquiring a ground penetrating radar signal of a predefined underground space, where the ground penetrating radar signal carries discontinuous information about an electrical parameter of the underground space; determining, from multiple preset dip angles, a target dip angle of the ground penetrating radar signal with respect to each of multiple channels to be
(Continued)

scanned, by a target scanning algorithm; separating the ground penetrating radar signal according to the target dip angle, to obtain a scattered wave; performing velocity continuation analysis on the scattered wave, to obtain a focusing velocity of the scattered wave; and imaging the scattered wave according to the scattered wave and the focusing velocity, to obtain an imaging result, where the imaging result is used to determine distribution information of the discontinuous body in the predefined underground space.

5 Claims, 5 Drawing Sheets

(51) Int. Cl.
*G01S 13/42* (2006.01)
*G01S 13/88* (2006.01)
G01S 7/288 (2006.01)
G01S 7/292 (2006.01)

(52) U.S. Cl.
CPC ..... *G01S 7/2922* (2013.01); *G01S 2007/2883* (2013.01)

(58) Field of Classification Search
USPC .......................................................... 342/22
See application file for complete search history.

(56) References Cited

FOREIGN PATENT DOCUMENTS

| | | |
|---|---|---|
| CN | 103439707 A | 12/2013 |
| CN | 104020495 A | 9/2014 |
| CN | 105182328 A | 12/2015 |
| WO | 2010/101630 A1 | 9/2010 |

OTHER PUBLICATIONS

Written Opinion of the International Searching Authority for Application No. PCT/CN2016/113068, dated Jul. 14, 2017.
Chinese Office Action dated Dec. 18, 2017; Chinese Application No. 201610991641.7.

* cited by examiner

METHOD AND DEVICE FOR DETECTING DISCONTINUOUS BODY WITH GROUND PENETRATING RADAR

The present application claims the priority to the Chinese patent application with the filing No. 201610991641.7, field with the State Intellectual Property Office on Nov. 10, 2016, entitled "Method and Device for Detecting Discontinuous Body with Ground Penetrating Radar", contents of which are incorporated herein by reference in its entirety.

TECHNICAL FIELD

The present disclosure relates to the field of ground penetrating radar detection, and particularly to a method and device for detecting a discontinuous body with ground penetrating radar.

BACKGROUND ART

With the rapid development of national industry, coal and oil play a vital role for China. During the process of coal mining and oil extraction, there is a need to detect underground distribution situations. As to the current underground advanced detecting technology, ground penetrating radar is mainly used. Ground penetrating radar is an effective means for exploring an underground target, which has been developed in past decades, and it has a very broad application prospect in numerous fields such as road, airport, water conservancy, mine, tunnel and archaeology. However, ground penetrating radar still has many deficiencies and thus needs further research in terms of data processing, and particularly has problems such as how to finely locate an underground pipeline or a fracture-developed zone.

As to the technical problem existing in the prior art that a poor detection accuracy is resulted from a single detection mode in detecting a discontinuous body, no effective solution has been proposed at present.

SUMMARY

An objective of the present disclosure is to provide a method and device for detecting a discontinuous body with ground penetrating radar, which alleviates the technical problem existing in the prior art that a poor detection accuracy is resulted from a single detection mode in detecting a discontinuous body.

According to an aspect of embodiments of the present disclosure, a method for detecting a discontinuous body with ground penetrating radar is provided, which includes: acquiring a ground penetrating radar signal of a predefined underground space, where the ground penetrating radar signal carries discontinuous information about an electrical parameter of the underground space; determining, from a plurality of preset dip angles, a target dip angle of the ground penetrating radar signal with respect to each of a plurality of channels to be scanned, by means of a target scanning algorithm; separating the ground penetrating radar signal according to the target dip angle, to obtain a scattered wave; performing velocity continuation analysis on the scattered wave, to obtain a focusing velocity of the scattered wave; and imaging the scattered wave according to the scattered wave and the focusing velocity, to obtain an imaging result, where the imaging result is used to determine distribution information of the discontinuous body in the predefined underground space.

Furthermore, the target scanning algorithm includes dip-scanning, and the step of determining, from a plurality of preset dip angles, a target dip angle of the ground penetrating radar signal with respect to each of a plurality of channels to be scanned, by means of a target scanning algorithm, includes: acquiring the plurality of preset dip angles and channel number information of each of the channels to be scanned; inputting each of the plurality of preset dip angles successively, along with the channel number information, into a dip-scanning equation for scanning computation, to obtain a plurality of energy values; and determining a maximal energy value among the plurality of energy values obtained through the computation, and taking as the target dip angle a preset dip angle corresponding to the maximal energy value.

Furthermore, the step of separating the ground penetrating radar signal according to the target dip angle to obtain a scattered wave includes: inputting the target dip angle into a plane wave destruction equation; and solving the plane wave destruction equation to obtain a computation result, and taking the result as the scattered wave.

Furthermore, the step of performing velocity continuation analysis on the scattered wave to obtain a focusing velocity of the scattered wave includes: migrating the scattered wave by using a Kirchhoff migration algorithm, to obtain an initial migration result; substituting a time variable in the initial migration result with a first variable, to obtain a transformed initial migration result, where the time variable and the first variable are in a relationship $b=t^2$, in which b represents the first variable and t represents the time variable; applying fast Fourier transform to the first variable and a second variable in the transformed initial migration result, to obtain a fast Fourier transform migration result; calculating a product of the fast Fourier transform migration result and a continuation factor, to obtain migration velocity continuation data; applying fast Fourier inverse transform to the migration velocity continuation data, and substituting the first variable in the migration velocity continuation data after the inverse transform with the time variable, to obtain a plurality of migrated objects, where the time variable and the first variable are in a relationship $t=\sqrt{b}$; and selecting a target migrated object from the plurality of migrated objects and taking as the focusing velocity a migration velocity corresponding to the target migrated object, where the target migrated object is a migrated object having a maximal energy among the plurality of migrated objects.

Furthermore, the step of acquiring a ground penetrating radar signal includes: acquiring an initial ground penetrating radar signal; and performing de-noising processing on the initial ground penetrating radar signal by means of a wavelet threshold algorithm, to obtain the ground penetrating radar signal, where the wavelet threshold algorithm includes wavelet decomposition, threshold processing and wavelet reconstruction.

According to an aspect of embodiments of the present disclosure, a device for detecting a discontinuous body with ground penetrating radar is provided, which includes: an acquisition unit configured to acquire a ground penetrating radar signal of a predefined underground space, where the ground penetrating radar signal carries discontinuous information about an electrical parameter of the underground space; a determination unit configured to determine, from a plurality of preset dip angles, a target dip angle of the ground penetrating radar signal with respect to each of a plurality of channels to be scanned, by means of a target scanning algorithm; a separation unit configured to separate the ground penetrating radar signal according to the target dip angle, to obtain a scattered wave; an analysis unit configured to perform velocity continuation analysis on the scattered wave, to obtain a focusing velocity of the scattered wave; and an imaging unit configured to image the scattered wave according to the scattered wave and the focusing velocity, to obtain an imaging result, where the imaging result is used to determine distribution information of the discontinuous body in the predefined underground space.

Furthermore, the target scanning algorithm includes dip-scanning, and the determination unit includes: a first acquisition module configured to acquire the plurality of preset dip angles and channel number information of each of the channels to be scanned; a first data loading module configured to input each of the plurality of preset dip angles successively, along with the channel number information, into a dip-scanning equation for scanning computation, to obtain a plurality of energy values; and a first determination module configured to determine a maximal energy value among the plurality of energy values obtained through the computation, and take as the target dip angle a preset dip angle corresponding to the maximal energy value.

Furthermore, the separation unit includes: a second data loading module configured to input the target dip angle into a plane wave destruction equation; and a first computation module configured to solve the plane wave destruction equation to obtain a computation result, and take the result as the scattered wave.

Furthermore, the analysis unit includes: a migration module configured to migrate the scattered wave by using a Kirchhoff migration algorithm, to obtain an initial migration result; a substitution module configured to substitute a time variable in the initial migration result with a first variable, to obtain a transformed initial migration result, where the time variable and the first variable are in a relationship $b=t^2$, in which b represents the first variable and t represents the time variable; a first transformation module configured to apply fast Fourier transform to the first variable and a second variable in the transformed initial migration result, to obtain a fast Fourier transform migration result; a second computation module configured to calculate a product of the fast Fourier transform migration result and a continuation factor, to obtain migration velocity continuation data; a second transformation module configured to apply fast Fourier inverse transform to the migration velocity continuation data, and substitute the first variable in the migration velocity continuation data after the inverse transform with the time variable, to obtain a plurality of migrated objects, where the time variable and the first variable are in a relationship $t=\sqrt{b}$; and a second determination module configured to select a target migrated object from the plurality of migrated objects and to take as the focusing velocity a migration velocity corresponding to the target migrated object, where the target migrated object is a migrated object having a maximal energy among the plurality of migrated objects.

Furthermore, the acquisition unit includes: a second acquisition module configured to acquire an initial ground penetrating radar signal; and a de-noising module configured to perform de-noising processing on the initial ground penetrating radar signal by means of a wavelet threshold algorithm, to obtain the ground penetrating radar signal, where the wavelet threshold algorithm includes wavelet decomposition, threshold processing and wavelet reconstruction.

In the embodiments of the present disclosure, a ground penetrating radar signal carrying discontinuous information in a predefined underground space is firstly acquired; then, based on a corresponding scanning algorithm, scan processing is accordingly preformed on the ground penetrating radar signal, to obtain a target dip angle of the ground penetrating radar signal with respect to each of a plurality of channels to be scanned; next, the ground penetrating radar signal is separated according to the target dip angle to obtain a scattered wave, and velocity continuation analysis is performed on the scattered wave; and finally, imaging processing is performed according to the scattered wave after the velocity continuation analysis, and distribution information of the discontinuous body is determined according to the imaging result. Compared with a detection method in the prior art that merely adopts ground penetrating radar, in the embodiments of the present disclosure, the dip angle, the focusing velocity and the imaging of the scattered wave are combined therein, which enables the discontinuous body to be more accurately detected, and alleviates the technical problem existing in the prior art that a poor detection accuracy is resulted from a single detection mode in detecting a discontinuous body. Therefore, a technical effect of improving the detection accuracy of a discontinuous body is achieved.

BRIEF DESCRIPTION OF THE DRAWINGS

In order to more clearly describe specific embodiments of the present disclosure or technical solutions in the prior art, drawings to be used in the description of the specific embodiments or the prior art will be simply introduced below. Apparently, the drawings in the following description illustrate some embodiments of the present disclosure, and for a person skilled in the art, further drawings could be obtained in light of these drawings without inventive efforts.

DETAILED DESCRIPTION OF THE EMBODIMENTS

Figure 1:
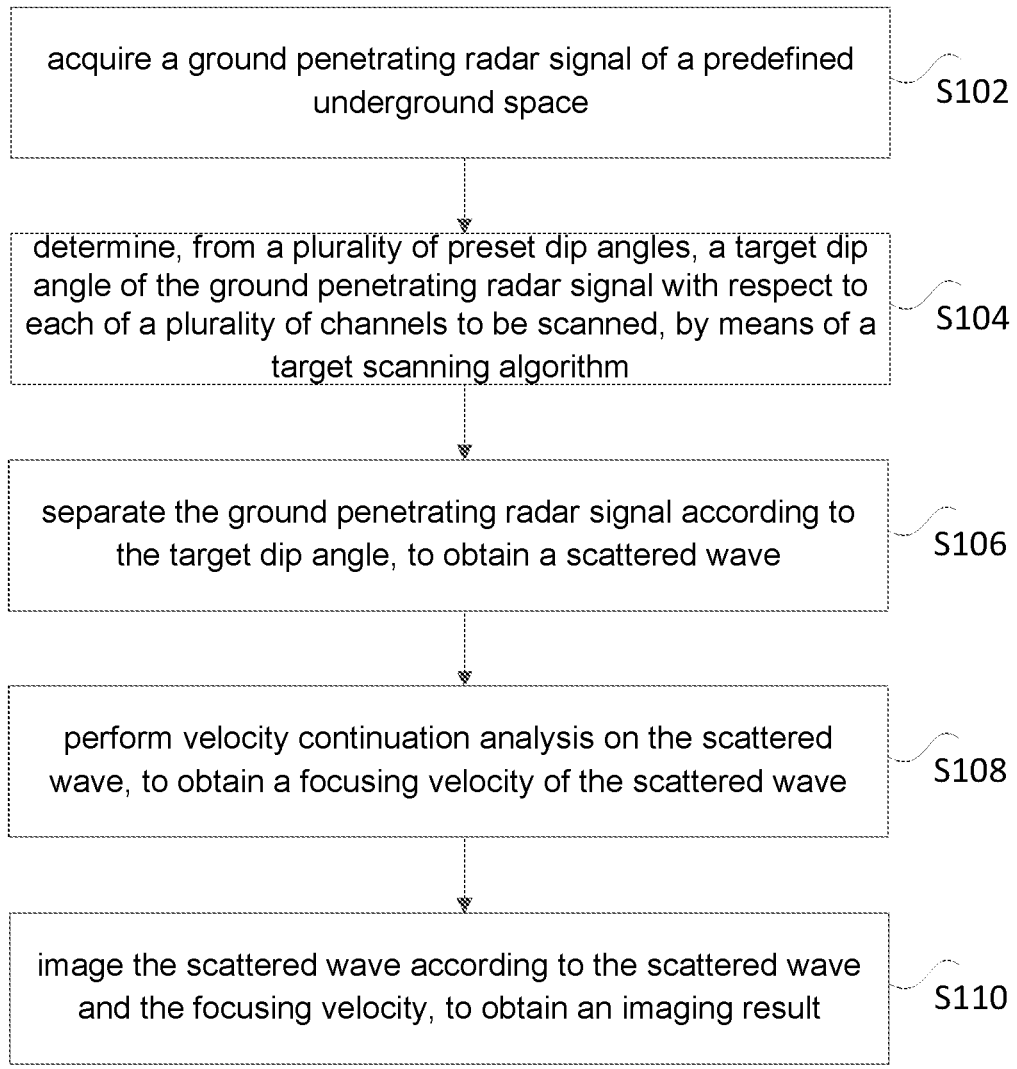
FIG. 1 is a flow chart of a method for detecting a discontinuous body with ground penetrating radar according to embodiments of the present disclosure.

Technical solutions of the present disclosure will be described clearly and completely hereinafter, in conjunction with the drawings. Apparently, the described embodiments are merely partial but not all embodiments of the present disclosure. All further embodiments, obtained by a person skilled in the art based on the embodiments in the present disclosure without inventive efforts, should fall within the scope of protection of the present disclosure.

In the description of the present disclosure, it shall be clarified that orientational or positional relationships indicated by terms, such as "central", "upper", "lower", "left", "right", "vertical", "horizontal", "inner", and "outer", are based on orientational or positional relationships shown in the drawings, only for facilitating the description of the present disclosure and for simplifying the description, rather than indicating or implying that a related device or element has to be in a specific orientation, or configured and operated in a certain orientation, and therefore these terms cannot be construed as limiting the present disclosure. In addition, terms, such as "first", "second", and "third", are used merely for purpose of description, and cannot be construed as indicating or implying a relative importance.

In the description of the present disclosure, it shall be clarified that, unless otherwise expressly specified or defined, terms such as "mount", "connect", and "connection" shall be construed in a broad sense. For embodiment, it could be either a fixed connection, or a detachable connection, or an integrated connection; it could be either a mechanical connection, or an electrical connection; and it could be either a direct connection, or an indirect connection via an intermediate medium, or an inner communication between two elements. For a person skilled in the art, the specific meanings of the above-mentioned terms in the present disclosure could be construed in accordance with specific circumstances.

According to an embodiment of the present disclosure, an embodiment of a method for detecting a discontinuous body with ground penetrating radar is provided.

FIG. 1 is a flow chart of the method for detecting a discontinuous body with ground penetrating radar according to the embodiment of the present disclosure. As shown in FIG. 1, this method includes steps as follows.

In step S102, a ground penetrating radar signal of a predefined underground space is acquired, where the ground penetrating radar signal carries discontinuous information about an electrical parameter of the underground space.

In the embodiment of the present disclosure, for acquiring a ground penetrating radar signal, a radar observation system may be arranged on the ground of a predefined underground space, and then a radar echo signal (i.e., the ground penetrating radar signal) is acquired in a self-excitation and self-reception manner. The self-excitation and self-reception manner means that a transmitting antenna for transmitting an excitation signal and a receiving antenna for receiving an echo signal are arranged approximately at a same position. Discontinuous information about an electrical parameter of the underground space is carried in the echo signal received by the receiving antenna, and this discontinuous information can be used to determine distribution of the discontinuous body in the underground space, where the discontinuous body includes a fault, a crack or the like.

In step S104, a target dip angle of the ground penetrating radar signal with respect to each of a plurality of channels to be scanned is determined from a plurality of preset dip angles, by means of a target scanning algorithm.

In the embodiment of the present disclosure, the dip angle represents an angle formed between a rock face or an ore face in the underground space and a horizontal plane. Generally, the dip angle is represented by a time difference/common-depth-point ($\Delta t/CDP$), and the dip angle includes a positive dip angle and a negative dip angle. The plurality of channels to be scanned and the plurality of preset dip angles mentioned above are preset by a relevant technical staff, and the specific numbers of the channels to be scanned and of the preset dip angles may be selected according to actual requirements, which is not specifically defined in the embodiment of the present disclosure.

It shall be clarified that, in the embodiment of the present disclosure, the term "channel" indicates a transmission channel for a ground penetrating radar signal when this signal is received by the receiving antenna in the radar observation system arranged on the ground.

Assuming that there are a preset dip angles and the channel numbers for the channels to be scanned are respectively 1, 2 and 3, a target dip angle 1 of the ground penetrating radar signal with respect to the channel to be scanned with the channel number 1 is firstly determined from the a preset dip angles; then, a target dip angle 2 of the ground penetrating radar signal with respect to the channel to be scanned with the channel number 2 is determined from the a preset dip angles; and finally, a target dip angle 3 of the ground penetrating radar signal with respect to the channel to be scanned with the channel number 3 is determined from the a preset dip angles.

In step S106, the ground penetrating radar signal is separated according to the target dip angle, to obtain a scattered wave.

In the embodiment of the present disclosure, after the target dip angles are determined, the ground penetrating radar signal may be separated according to the target dip angle, and a scattered wave may be obtained accordingly during the separation of the ground penetrating radar signal.

In step S108, velocity continuation analysis is performed on the scattered wave, to obtain a focusing velocity of the scattered wave.

In the embodiment of the present disclosure, after the scattered wave is obtained through the separation, the velocity continuation analysis may be performed on the scattered wave after the separation, to finally obtain the focusing velocity of the scattered wave.

In step S110, the scattered wave are imaged according to the scattered wave and the focusing velocity, to obtain an imaging result, where the imaging result is used to determine distribution information of the discontinuous body in the predefined underground space.

In the embodiment of the present disclosure, after the scattered wave and the focusing velocity of the scattered wave are acquired, a corresponding imaging technology may be utilized to image the scattered wave, to obtain an imaging result of the scattered wave. After the imaging result is determined, the distribution information of the discontinuous body in the predefined underground space may be determined according to the imaging result.

It shall be clarified that, in the embodiment of the present disclosure, it is preferable to utilize a Kirchhoff migration imaging method to perform migration imaging on the scattered wave.

In the embodiment of the present disclosure, a ground penetrating radar signal carrying discontinuous information in a predefined underground space is firstly acquired; then, based on a corresponding scanning algorithm, scan processing is accordingly preformed on the ground penetrating radar signal, to obtain a target dip angle of the ground penetrating radar signal with respect to each of a plurality of channels to be scanned; next, the ground penetrating radar signal is separated according to the target dip angle to obtain a scattered wave, and velocity continuation analysis is performed on the scattered wave; and finally, imaging processing is performed according to the scattered wave after the velocity continuation analysis, and distribution information of the discontinuous body is determined according to the imaging result. Compared with a detection method in the prior art that merely adopts ground penetrating radar, in the embodiments of the present disclosure, the dip angle, the focusing velocity and the imaging of the scattered wave are combined therein, which enables the discontinuous body to be more accurately detected, and alleviates the technical problem existing in the prior art that a poor detection accuracy is resulted from a single detection mode in detecting a discontinuous body. Therefore, a technical effect of improving the detection accuracy of a discontinuous body is achieved.

In an optional implementation of the present disclosure, the acquisition of the ground penetrating radar signal includes steps as follows.

In step S1021, an initial ground penetrating radar signal is acquired; and

In step S1022, de-noising processing is performed on the initial ground penetrating radar signal by means of a wavelet threshold algorithm, to obtain the ground penetrating radar signal, where the wavelet threshold algorithm includes wavelet decomposition, threshold processing and wavelet reconstruction.

In the embodiment of the present disclosure, the initial ground penetrating radar signal may be firstly acquired by the receiving antenna in the radar observation system arranged on the ground. Besides the ground penetrating radar signal, various noises are contained in this initial ground penetrating radar signal. On this basis, after the initial ground penetrating radar signal is acquired, it is preferable to adopt the wavelet threshold algorithm to perform the de-noising processing on the initial ground penetrating radar signal. The wavelet threshold algorithm includes three steps of wavelet decomposition, threshold processing and wavelet reconstruction. By performing the three steps of wavelet decomposition, threshold processing and wavelet reconstruction on the initial ground penetrating radar signal, the purpose of de-noising may be achieved, to reduce interference caused by the noises during the subsequent processing on the ground penetrating radar signal.

Figure 2:
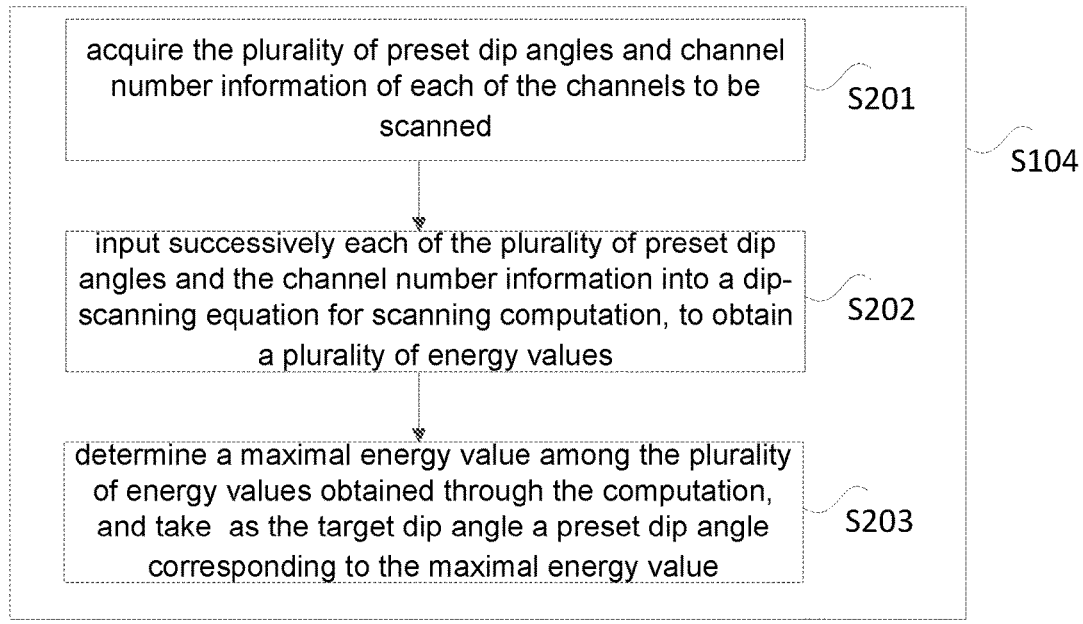
FIG. 2 is a flow chart showing the determination of a target dip angle according to embodiments of the present disclosure.

After the above-mentioned steps S1021 and S1022 are performed, the target dip angle of the ground penetrating radar signal with respect to each of the plurality of channels to be scanned may be determined from the plurality of preset dip angles, and the specific determination process is shown in FIG. 2.

FIG. 2 is a flow chart showing the determination of the target dip angle according to an embodiment of the present disclosure. As shown in FIG. 2, in a situation where the target scanning algorithm is a dip-scanning algorithm, the step of determining, from a plurality of preset dip angles, a target dip angle of the ground penetrating radar signal with respect to each of a plurality of channels to be scanned by means of a target scanning algorithm, includes steps as follows.

In step S201, the plurality of preset dip angles and channel number information of each of the channels to be scanned are acquired.

In step S202, each of the plurality of preset dip angles and the channel number information are successively input into a dip-scanning equation for scanning computation, to obtain a plurality of energy values.

In step S203, a maximal energy value is determined from the plurality of energy values obtained through the computation, and a preset dip angle corresponding to the maximum energy value is taken as the target dip angle.

In the embodiment of the present disclosure, during determining, from the plurality of preset dip angles, the target dip angle of the ground penetrating radar signal with respect to each of the plurality of channels to be scanned, the plurality of preset dip angles and the channel number information of the channels to be scanned are firstly acquired. It is assumed that the acquired plurality of preset dip angles σ are four dip angles of 0, 2, 4, 6, respectively, and the currently acquired channel number information is N=1.

After the plurality of preset dip angles σ and the channel number information are acquired, the plurality of preset dip angles σ are respectively substituted, along with the channel number information, into a formula $$y_i(t) = \frac{1}{2N+1} \sum_{j=k-N}^{k+N} x_j[t + (k-j)\sigma]$$

for iterative computation, to obtain energy values through the computation, where $y_i(t)$ represents each result of superposition during scanning (i.e., the energy value), i represents the times of slope scanning, j represents the channel number used during scanning, k represents a center channel number of the scanning, σ represents the preset dip angle (i.e., slope information), and 2N+1 represents the number of the scanned channels. Assuming that the plurality of preset dip angles σ are four dip angles of 0, 2, 4, 6, respectively, the four dip angles are respectively substituted into the above-mentioned formula for computation, hereby obtaining $y_1(t)$, $y_2(t)$, $y_3(t)$ and $y_4(t)$. Specifically, $y_1(t)$, $y_2(t)$, $y_3(t)$ and $y_4(t)$ are represented as follows.

Figure 3:
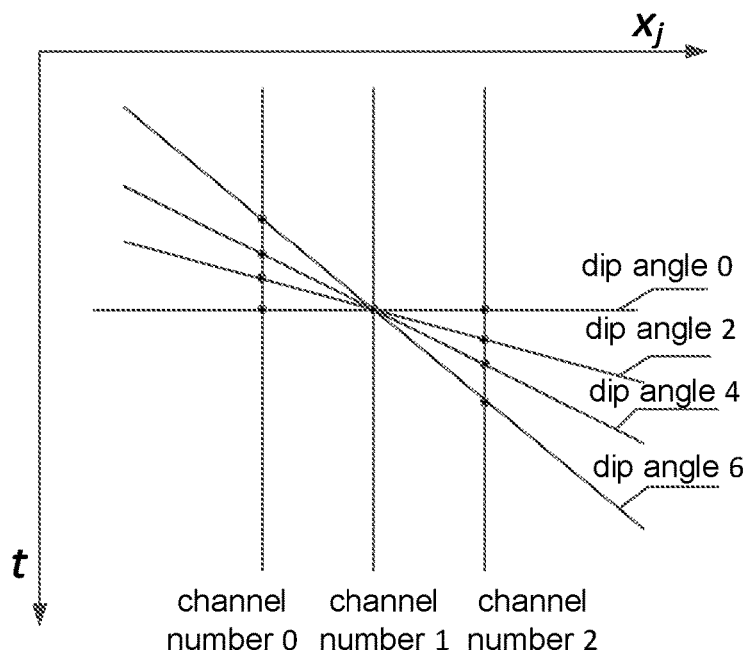
FIG. 3 is a schematic diagram showing a dip-scanning range according to embodiments of the present disclosure.

If N=1, then k=1, 2N+1=3, k−N=0, and k+N=2, and in this case, $y_1(t)$ is represented by $y_1(t)=\frac{1}{3}\{(x_{00}[t_{00}+(1-0)0])+(x_{01}[t_{01}+(1-1)0])+(x_{02}[t_{02}+(1-2)0])\}$, where as shown in FIG. 3, $x_{00}$ and $t_{00}$ are coordinate values of a point of intersection between dip angle 0 and the channel to be scanned with the channel number 0, $x_{01}$ and $t_{01}$ are coordinate values of a point and intersection between dip angle 0 and the channel to be scanned with the channel number 1, and $x_{02}$ and $t_{02}$ are coordinate values of a point of intersection between dip angle 0 and the channel to be scanned with the channel number 2; $y_2(t)=\frac{1}{3}\{(x_{20}[t_{20}+(1-0)2])+(x_{21}[t_{21}+(1-1)2])+(x_{22}[t_{22}+(1-2)2])\}$, where as shown in FIG. 3, $x_{20}$ and $t_{20}$ are coordinate values of a point of intersection between dip angle 2 and the channel to be scanned with the channel number 0, $x_{21}$ and $t_{21}$ are coordinate values of a point of intersection between dip angle 2 and the channel to be scanned with the channel number 1, and $x_{22}$ and $t_{22}$ are coordinate values of a point of intersection between dip angle 2 and the channel to be scanned with the channel number 2; $y_3(t)=\frac{1}{3}\{(x_{40}[t_{40}+(1-0)4])+(x_{41}[t_{41}+(1-1)4])+(x_{42}[t_{42}+(1-2)4])\}$, where as shown in FIG. 3, $x_{40}$ and $t_{40}$ are coordinate values of a point of intersection between dip angle 4 and the channel to be scanned with the channel number 0, $x_{41}$ and $t_{41}$ are coordinate values of a point of intersection between dip angle 4 and the channel to be scanned with the channel number 1, and $x_{42}$ and $t_{42}$ are coordinate values of a point of intersection between dip angle 4 and the channel to be scanned with the channel number 2; and $y_4(t)=\frac{1}{3}\{(x_{60}[t_{60}+(1-0)6])+(x_{61}[t_{61}+(1-1)6])+(x_{62}[t_{62}+(1-2)6])\}$, where as shown in FIG. 3, $x_{60}$ and $t_{60}$ are coordinate values of a point of intersection between dip angle 6 and the channel to be scanned with the channel number 0, $x_{61}$ and $t_{61}$ are coordinate values of a point of intersection between dip angle 6 and the channel to be scanned with the channel number 1, and $x_{62}$ and $t_{62}$ are coordinate values of a point of intersection between dip angle 6 and the channel to be scanned with the channel number 2.

After the above-mentioned $y_1(t)$, $y_2(t)$ $y_3(t)$ and $y_4(t)$ are determined, a plurality of energy values are obtained. In this case, a maximum energy value is determined from $y_1(t)$, $y_2(t)$ $y_3(t)$ and $y_4(t)$, and a preset dip angle corresponding to the maximum energy value is taken as the target dip angle. Assuming that $y_2(t)$ produces the maximum energy value, the preset dip angle 2 is taken as the target dip angle of the ground penetrating radar signal with respect to the channel to be scanned with the channel number 1.

Furthermore, in determining the target dip angle of the ground penetrating radar signal with respect to the channel to be scanned with the channel number 2, the value of N is 2, and accordingly, k=2, 2N+1=5, k−N=0, and k+N=4. Specifically, the way of determining the target dip angle of the ground penetrating radar signal with respect to the channel to be scanned with the channel number 2 is the same as that of determining the target angle of the ground penetrating radar signal with respect to the channel to be scanned with the channel number 1 described above, which will not be repeated herein.

Figure 4:
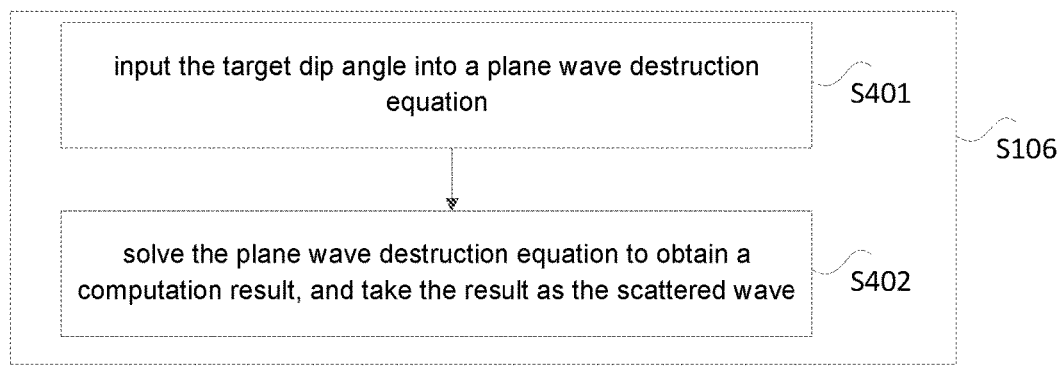
FIG. 4 is a flow chart showing the separation of a ground penetrating radar signal according to embodiments of the present disclosure.

After the above-mentioned steps S201 to S203 are performed, the ground penetrating radar signal may be separated according to the target dip angle, to obtain a scattered wave, where the specific separation process is shown in FIG. 4.

FIG. 4 is a flow chart showing the separation of the ground penetrating radar signal according to an embodiment of the present disclosure. As shown in FIG. 4, the step of separating the ground penetrating radar signal according to the target dip angle to obtain a scattered wave includes steps as follows.

In step S401, the target dip angles are input into a plane wave destruction equation.

In step S402, the plane wave destruction equation is solved to obtain a computation result, and the result is taken as the scattered wave.

In the embodiment of the present disclosure, after the target dip angle of the ground penetrating radar signal with respect to each of the plurality of channels to be scanned is determined, the target dip angles may be input into a preset plane wave destruction equation for solving, and the solving results are taken as the scattered wave.

Specifically, the calculated target dip angles may be input into the following plane wave destruction equation:

$$\begin{bmatrix} d_1 \\ d_2 \\ d_3 \\ \vdots \\ d_M \end{bmatrix} = \begin{bmatrix} I & 0 & 0 & \cdots & 0 \\ -P_{1,2}(\sigma_1) & I & 0 & 0 & 0 \\ 0 & -P_{2,3}(\sigma_2) & I & 0 & 0 \\ \vdots & \vdots & \vdots & \vdots & \vdots \\ 0 & 0 & \cdots & -P_{M-1,M}(\sigma_{M-1}) & I \end{bmatrix} \begin{bmatrix} s_1 \\ s_2 \\ s_3 \\ \vdots \\ s_M \end{bmatrix},$$

where $\sigma_1, \sigma_2, \ldots, \sigma_{M-1}$ respectively represent the target dip angle of the ground penetrating radar signal with respect to the channel to be scanned with the channel number 1, the target dip angle of the ground penetrating radar signal with respect to the channel to be scanned with the channel number 2, . . . , and the target dip angle of the ground penetrating radar signal with respect to the channel to be scanned with the channel number M−1. Specifically, $\sigma_1$, $\sigma_2, \ldots, \sigma_{M-1}$ each are obtained through the above-mentioned method described in steps S201 to S203.

Furthermore, $[d_1, d_2, \ldots, d_M]^T$ in this plane wave destruction equation represents the ground penetrating radar scattered wave obtained through the separation, $s=[s_1, s_2, \ldots, s_M]^T$ represents the ground penetrating radar signal, $\sigma_{M-1}$ represents the slope, and $P_{M-1,M}(\sigma_{M-1})$ represents that data at the $M^{th}$ channel is predicted from data at the $(M-1)^{th}$ channel. Specifically, $P_{M-1,M}(\sigma_{M-1})$ is represented by the following formula:

$$P_{M-1,M}(\sigma_{M-1}) = \frac{(1-\sigma_{M-1})(2-\sigma_{M-1})}{12}(Z_i - Z_i^{-1}Z_x) + \frac{(2-\sigma_{M-1})(2+\sigma_{M-1})}{6}(1-Z_x) + \frac{(1+\sigma_{M-1})(2+\sigma_{M-1})}{12}(Z_t^{-1} - Z_tZ_x)$$

where $Z_t$ and $Z_x$ are Z transformations of variables t and x, respectively.

Figure 5:
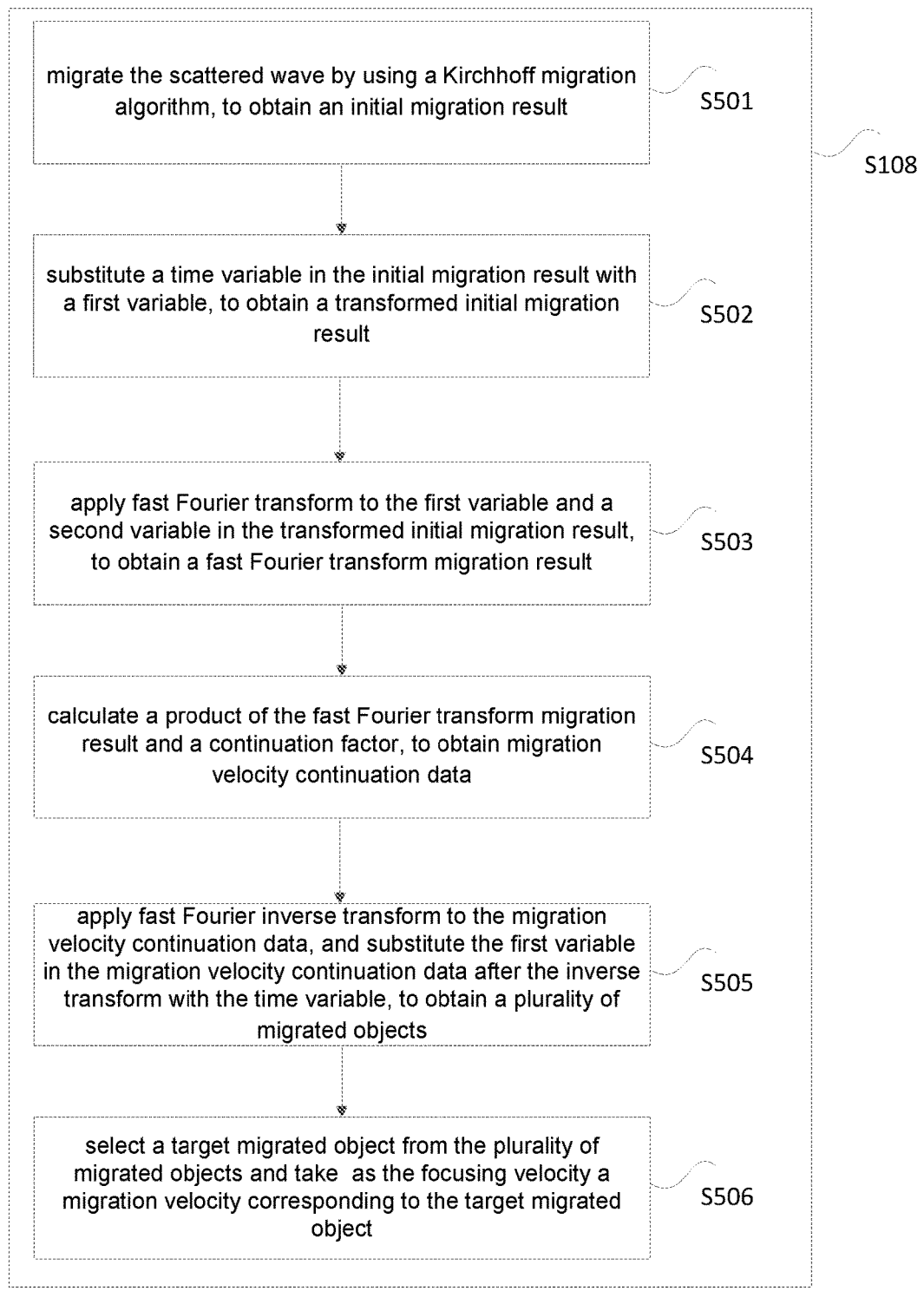
FIG. 5 is a flow chart showing the velocity continuation analysis on a scattered wave according to embodiments of the present disclosure.

FIG. 5 is a flow chart showing the velocity continuation analysis on the scattered wave according to an embodiment of the present disclosure. As shown in FIG. 5, the step of performing velocity continuation analysis on the scattered wave to obtain a focusing velocity of the scattered wave includes steps as follows.

In step S501, the scattered wave is migrated by using a Kirchhoff migration algorithm, to obtain an initial migration result.

In the embodiment of the present disclosure, Kirchhoff migration is firstly performed on the scattered wave separated from the ground penetrating radar, to obtain the initial migration result.

In step S502, a time variable in the initial migration result is substituted with a first variable, to obtain a transformed initial migration result, where the time variable and the first variable are in a relationship $b=t^2$, in which b represents the first variable and t represents the time variable.

In the embodiment of the present disclosure, the first variable b is introduced; and according to the relationship $b=t^2$, the time axis t of the initial migration result is transformed into $b=t^2$.

In step S503, fast Fourier transform is applied to the first variable and a second variable in the transformed initial migration result, to obtain a fast Fourier transform migration result.

In the embodiment of the present disclosure, fast Fourier transform is applied to the second variable x and the first variable b, to obtain FFT migration data, i.e., the fast Fourier transform migration result.

In step S504, a product of the fast Fourier transform migration result and a continuation factor is calculated, to obtain migration velocity continuation data.

In the embodiment of the present disclosure, the FFT migration data is multiplied by a continuation factor $$e^{\frac{ik^2(v_0^2-v^2)}{4\Omega}},$$

to obtain migration velocity continuation data, where k represents the wave number, v represents a scanning velocity, $\Omega$ represents a variable in frequency domain, and $v_0$ represents an initial value of the scanning velocity.

In step S505, fast Fourier inverse transform is applied to the migration velocity continuation data, and the first variable in the migration velocity continuation data after the inverse transform is substituted with the time variable, to obtain a plurality of migrated objects, where the time variable and the first variable are in a relationship $t=\sqrt{b}$.

In the embodiment of the present disclosure, fast Fourier inverse transform is applied to the migration velocity continuation data, and the data after the fast Fourier inverse transform is transformed based on $t=\sqrt{b}$, to obtain migrated objects corresponding to different migration velocities.

In step S506, a target migrated object is selected from the plurality of migrated objects, and a migration velocity corresponding to the target migrated object is taken as the focusing velocity, where the target migrated object is a migrated object having a maximal energy among the plurality of migrated objects.

In the embodiment of the present disclosure, the migration velocity, corresponding to the selected migrated object having the maximum energy, is the focusing velocity of the ground penetrating radar scattered wave.

In summary, the method for detecting a discontinuous body provided by the present disclosure includes: acquiring a ground penetrating radar signal; then, performing de-noising processing on the ground penetrating radar signal with a wavelet threshold algorithm; next, obtaining energy values of the ground penetrating radar signal through dip-scanning, and estimating information of the scattered wave with a plane wave destruction equation; and finally, performing velocity continuation analysis according to the ground penetrating radar scattered wave obtained through separation to obtain a focusing velocity of the ground penetrating radar scattered wave, and imaging the ground penetrating radar scattered wave by means of a Kirchhoff migration method, to thereby determine the distribution information of the discontinuous body according to the imaging result. The method for detecting a discontinuous object provided by the embodiment of the present disclosure is a non-destructive detection method directed for a discontinuous target, such as an underground pipeline and fracture, and thus has an important application value in fields such as mine, tunnel and the like.

An embodiment of the present disclosure further provides a device for detecting a discontinuous body with ground penetrating radar, which is mainly used to execute the method for detecting a discontinuous body with ground penetrating radar provided by the above-mentioned embodiments of the present disclosure. The device for detecting a discontinuous body with ground penetrating radar provided by the embodiment of the present disclosure will be specifically introduced hereinafter.

Figure 6:
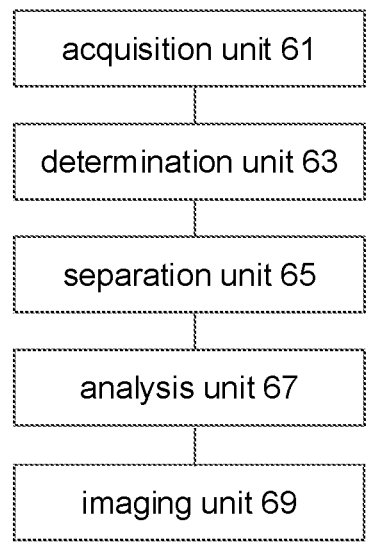
FIG. 6 is a schematic diagram of a device for detecting a discontinuous body with ground penetrating radar according to embodiments of the present disclosure.

FIG. 6 is a schematic diagram of the device for detecting a discontinuous body with ground penetrating radar according to an embodiment of the present disclosure. As shown in FIG. 6, this device for detecting a discontinuous body mainly includes: an acquisition unit 61, a determination unit 63, a separation unit 65, an analysis unit 67 and an imaging unit 69.

The acquisition unit 61 is configured to acquire a ground penetrating radar signal of a predefined underground space, where the ground penetrating radar signal carries discontinuous information about an electrical parameter of the underground space.

In the embodiment of the present disclosure, for acquiring a ground penetrating radar signal, a radar observation system may be arranged on the ground of a predefined underground space, and then a radar echo signal (i.e., the ground penetrating radar signal) is acquired in a self-excitation and self-reception manner. The self-excitation and self-reception manner means that a transmitting antenna for transmitting an excitation signal and a receiving antenna for receiving an echo signal are arranged approximately at a same position. Discontinuous information about an electrical parameter of the underground space is carried in the echo signal received by the receiving antenna, and this discontinuous information can be used to determine distribution of the discontinuous body in the underground space, where the discontinuous body includes a fault, a crack or the like.

The determination unit 63 is configured to determine, from a plurality of preset dip angles, a target dip angle of the ground penetrating radar signal with respect to each of a plurality of channels to be scanned, by means of a target scanning algorithm.

In the embodiment of the present disclosure, the dip angle represents an angle formed between a rock face or an ore face in the underground space and a horizontal plane. Generally, the dip angle is represented by a time difference/common-depth-point ($\Delta t/CDP$), and the dip angle includes a positive dip angle and a negative dip angle. The plurality of channels to be scanned and the plurality of preset dip angles mentioned above are preset by a relevant technical staff, and the specific numbers of the channels to be scanned and of the preset dip angles may be selected according to actual requirements, which is not specifically defined in the embodiments of the present disclosure.

It shall be clarified that, in the embodiment of the present disclosure, the term "channel" indicates a transmission channel for a ground penetrating radar signal when this signal is received by the receiving antenna in the radar observation system arranged on the ground.

Assuming that there are a preset dip angles and the channel numbers for the channels to be scanned are respectively 1, 2 and 3, a target dip angle 1 of the ground penetrating radar signal with respect to the channel to be scanned with the channel number 1 is firstly determined from the a preset dip angles; then, a target dip angle 2 of the ground penetrating radar signal with respect to the channel to be scanned with the channel number 2 is determined from the a preset dip angles; and finally, a target dip angle 3 of the ground penetrating radar signal with respect to the channel to be scanned with the channel number 3 is determined from the a preset dip angles.

The separation unit 65 is configured to separate the ground penetrating radar signal according to the target dip angle, to obtain a scattered wave.

In the embodiment of the present disclosure, after the target dip angles are determined, the ground penetrating radar signal may be separated according to the target dip angle, and a scattered wave may be obtained accordingly during the separation of the ground penetrating radar signal.

The analysis unit 67 is configured to perform velocity continuation analysis on the scattered wave, to obtain a focusing velocity of the scattered wave.

In the embodiment of the present disclosure, after the scattered wave is obtained through the separation, the velocity continuation analysis may be performed on the scattered wave after the separation, to finally obtain the focusing velocity of the scattered wave.

The imaging unit 69 is configured to image the scattered wave according to the scattered wave and the focusing velocity to obtain an imaging result, where the imaging result is used to determine distribution information of the discontinuous body in the predefined underground space.

In the embodiment of the present disclosure, after the scattered wave and the focusing velocity of the scattered wave are acquired, a corresponding imaging technology may be utilized to image the scattered wave, to obtain an imaging result of the scattered wave. After the imaging result is determined, the distribution information of the discontinuous body in the predefined underground space may be determined according to the imaging result.

It shall be clarified that, in the embodiment of the present disclosure, it is preferable to utilize a Kirchhoff migration imaging method to perform migration imaging on the scattered wave.

In the embodiment of the present disclosure, a ground penetrating radar signal carrying discontinuous information in a predefined underground space is firstly acquired; then, based on a corresponding scanning algorithm, scan processing is accordingly preformed on the ground penetrating radar signal, to obtain a target dip angle of the ground penetrating radar signal with respect to each of a plurality of channels to be scanned; next, the ground penetrating radar signal is separated according to the target dip angle to obtain a scattered wave, and velocity continuation analysis is performed on the scattered wave; and finally, imaging processing is performed according to the scattered wave after the velocity continuation analysis, and distribution information of the discontinuous body is determined according to the imaging result. Compared with a detection method in the prior art that merely adopts ground penetrating radar, in the embodiment of the present disclosure, the dip angle, the focusing velocity and the imaging of the scattered wave are combined therein, which enables the discontinuous body to be more accurately detected, and alleviates the technical problem existing in the prior art that a poor detection accuracy is resulted from a single detection mode in detecting a discontinuous body. Therefore, a technical effect of improving the detection accuracy of a discontinuous body is achieved.

Optionally, the target scanning algorithm includes dip-scanning, and the determination unit includes: a first acquisition module configured to acquire the plurality of preset dip angles and channel number information of each of the channels to be scanned; a first data loading module configured to input each of the plurality of preset dip angles successively, along with the channel number information, into a dip-scanning equation for scanning computation, to obtain a plurality of energy values; and a first determination module configured to determine a maximal energy value among the plurality of energy values obtained through computation, and to take as the target dip angle a preset dip angle corresponding to the maximal energy value.

Optionally, the separation unit includes: a second data loading module configured to input the target dip angle into a plane wave destruction equation; and a first computation module configured to solve the plane wave destruction equation to obtain a computation result, and to take the result as the scattered wave.

Optionally, the analysis unit includes: a migration module configured to migrate the scattered wave by using a Kirchhoff migration algorithm, to obtain an initial migration result; a substitution module configured to substitute a time variable in the initial migration result with a first variable, to obtain a transformed initial migration result, where the time variable and the first variable are in a relationship $b=t^2$, in which b represents the first variable and t represents the time variable; a first transformation module configured to apply fast Fourier transform to the first variable and a second variable in the transformed initial migration result, to obtain a fast Fourier transform migration result; a second computation module configured to calculating a product of the fast Fourier transform migration result and a continuation factor, to obtain migration velocity continuation data; a second transformation module configured to apply fast Fourier inverse transform to the migration velocity continuation data, and to substitute the first variable in the migration velocity continuation data after the inverse transform with the time variable so as to obtain a plurality of migrated objects, where the time variable and the first variable are in a relationship $t=\sqrt{b}$; and a second determination module configured to select a target migrated object from the plurality of migrated objects and to take as the focusing velocity a migration velocity corresponding to the target migrated object, where the target migrated object is a migrated object having a maximal energy among the plurality of migrated objects.

Optionally, the acquisition unit includes: a second acquisition module configured to acquire an initial ground penetrating radar signal; and a de-noising module configured to perform de-noising processing on the initial ground penetrating radar signal by means of a wavelet threshold algorithm, to obtain the ground penetrating radar signal, where the wavelet threshold algorithm includes wavelet decomposition, threshold processing and wavelet reconstruction.

At last, it shall be clarified that the above-mentioned embodiments are only used for describing the technical solutions of the present disclosure, rather than limiting the disclosure. Although the present disclosure has been described in detail with reference to the preceding embodiments, it shall be understood by a person skilled in the art that the technical solutions recited in the preceding embodiments could still be modified, or part or all of the technical features thereof could be substituted with equivalents, and these modifications or substitutions do not make the essence of the corresponding technical solutions depart from the scope of the technical solutions of the embodiments of the present disclosure.

The invention claimed is:

1. A method for detecting a discontinuous body with ground penetrating radar, comprising:
   acquiring a ground penetrating radar signal of a predefined underground space, wherein the ground penetrating radar signal carries discontinuous information about an electrical parameter of the underground space;
   determining, from a plurality of preset dip angles, a target dip angle of the ground penetrating radar signal with respect to each of a plurality of channels to be scanned, by means of a target scanning algorithm;
   separating the ground penetrating radar signal according to the target dip angle, to obtain a scattered wave;
   performing velocity continuation analysis on the scattered wave, to obtain a focusing velocity of the scattered wave; and
   imaging the scattered wave according to the scattered wave and the focusing velocity, to obtain an imaging result, wherein the imaging result is used to determine distribution information of the discontinuous body in the predefined underground space.

2. The method according to claim 1, wherein the target scanning algorithm comprises a dip-scanning algorithm, and the step of determining from a plurality of preset dip angles a target dip angle of the ground penetrating radar signal with respect to each of a plurality of channels to be scanned by means of a target scanning algorithm comprises:
   acquiring the plurality of preset dip angles and channel number information of each of the channels to be scanned;
   inputting successively each of the plurality of preset dip angles and the channel number information into a dip-scanning equation for scanning computation, to obtain a plurality of energy values; and
   determining a maximal energy value among the plurality of energy values obtained through the computation, and taking as the target dip angle a preset dip angle corresponding to the maximal energy value.

3. The method according to claim 2, wherein the step of separating the ground penetrating radar signal according to the target dip angle to obtain a scattered wave comprises:
   inputting the target dip angle into a plane wave destruction equation; and
   solving the plane wave destruction equation to obtain a computation result, and taking the result as the scattered wave.

4. The method according to claim 3, wherein the step of performing velocity continuation analysis on the scattered wave to obtain a focusing velocity of the scattered wave comprises:
   migrating the scattered wave by using a Kirchhoff migration algorithm, to obtain an initial migration result;
   substituting a time variable in the initial migration result with a first variable, to obtain a transformed initial migration result, wherein the time variable and the first variable are in a relationship $b=t^2$, where b represents the first variable and t represents the time variable;
   applying fast Fourier transform to the first variable and a second variable in the transformed initial migration result, to obtain a fast Fourier transform migration result;
   calculating a product of the fast Fourier transform migration result and a continuation factor, to obtain migration velocity continuation data;
   applying fast Fourier inverse transform to the migration velocity continuation data, and substituting the first variable in the migration velocity continuation data after the inverse transform with the time variable, to obtain a plurality of migrated objects, wherein the time variable and the first variable are in a relationship $t=\sqrt{b}$; and
   selecting a target migrated object from the plurality of migrated objects and taking as the focusing velocity a migration velocity corresponding to the target migrated object, wherein the target migrated object is a migrated object having a maximal energy among the plurality of migrated objects.

5. The method according to claim 1, wherein the step of acquiring a ground penetrating radar signal comprises:
   acquiring an initial ground penetrating radar signal; and
   performing de-noising processing on the initial ground penetrating radar signal by means of a wavelet threshold algorithm, to obtain the ground penetrating radar signal, wherein the wavelet threshold algorithm comprises wavelet decomposition, threshold processing and wavelet reconstruction.

* * * * *